(12) United States Patent
Wilson

(10) Patent No.: US 7,831,541 B2
(45) Date of Patent: Nov. 9, 2010

(54) SYSTEM AND METHOD FOR IMPLEMENTING BROWSER MILESTONE NAVIGATION IN A DATA PROCESSING SYSTEM

(75) Inventor: Jeffrey K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 11/946,619

(22) Filed: Nov. 28, 2007

(65) Prior Publication Data

US 2009/0138438 A1    May 28, 2009

(51) Int. Cl.
*G06F 17/00* (2006.01)
(52) U.S. Cl. ............ 707/601; 707/793; 707/796; 707/805; 715/738; 715/810; 715/835
(58) Field of Classification Search ........ 707/3, 707/5, 601, 793, 796, 805; 715/738, 810, 715/835
See application file for complete search history.

(56) References Cited

U.S. PATENT DOCUMENTS

| | | | |
|---|---|---|---|
| 5,416,900 A * | 5/1995 | Blanchard et al. | 715/804 |
| 6,338,059 B1 * | 1/2002 | Fields et al. | 707/4 |
| 6,667,751 B1 | 12/2003 | Wynn et al. | |
| 2002/0087432 A1 * | 7/2002 | Muniz | 705/27 |
| 2002/0198962 A1 * | 12/2002 | Horn et al. | 709/218 |
| 2004/0041835 A1 | 3/2004 | Lu | |
| 2004/0139143 A1 | 7/2004 | Canakapalli et al. | |
| 2006/0282416 A1 * | 12/2006 | Gross et al. | 707/3 |
| 2007/0005564 A1 * | 1/2007 | Zehner | 707/2 |
| 2007/0168465 A1 * | 7/2007 | Toppenberg et al. | 709/218 |
| 2007/0271230 A1 * | 11/2007 | Hart et al. | 707/3 |
| 2008/0141116 A1 * | 6/2008 | Mohan | 715/236 |
| 2008/0235594 A1 * | 9/2008 | Bhumkar et al. | 715/738 |
| 2008/0306933 A1 * | 12/2008 | Valliani et al. | 707/5 |
| 2009/0024467 A1 * | 1/2009 | Fontoura et al. | 705/14 |
| 2010/0082661 A1 * | 4/2010 | Beaudreau | 707/769 |

* cited by examiner

*Primary Examiner*—Wilson Lee
*Assistant Examiner*—Thanh-Ha Dang
(74) *Attorney, Agent, or Firm*—Dillion & Yudell

(57) ABSTRACT

A system and method for implementing browser milestone navigation in a data processing system. According to an embodiment of the present invention, a browser queries a search engine with at least one search term. In response to the query, the browser retrieves at least one web page that includes a collection of search results. The web page that includes the collection of search results is designated as a first master page. In response to the selection, the browser places a first address of the first master page on a master page address data structure. The browser traverses at least one page greater than one level removed from the first master page. The browser retrieves the first address from the master page address data structure, in response to receiving a first request to retrieve the first master page. The browser displays the first master page in the browser window without displaying any intermediate pages between the at least one web page greater than one level removed from the first master page and the first master page.

6 Claims, 4 Drawing Sheets

SYSTEM AND METHOD FOR IMPLEMENTING BROWSER MILESTONE NAVIGATION IN A DATA PROCESSING SYSTEM

BACKGROUND OF THE INVENTION

1. Technical Field

The present invention relates in general to the field of data processing systems and in particular, to the field of accessing information utilizing data processing systems. Still more particularly, the present invention relates to organizing access to information utilizing data processing systems.

2. Description of the Related Art

The Internet has fundamentally changed the way modern society communicates. Today, information that would have been difficult to obtain even ten years ago is easily accessible via the Internet. Through the utilization of a web browser, a user can gather information from websites located on the World Wide Web (WWW).

SUMMARY OF THE INVENTION

The present invention includes system and method for implementing browser milestone navigation in a data processing system. According to an embodiment of the present invention, a browser queries a search engine with at least one search term. In response to the query, the browser retrieves at least one web page that includes a collection of search results. The web page that includes the collection of search results is designated as a first master page. In response to the selection, the browser places a first address of the first master page on a master page address data structure. The browser traverses at least one page greater than one level removed from the first master page. The browser retrieves the first address from the master page address data structure, in response to receiving a first request to retrieve the first master page. The browser displays the first master page in the browser window without displaying any intermediate pages between the at least one web page greater than one level removed from the first master page and the first master page.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

Figure 1:
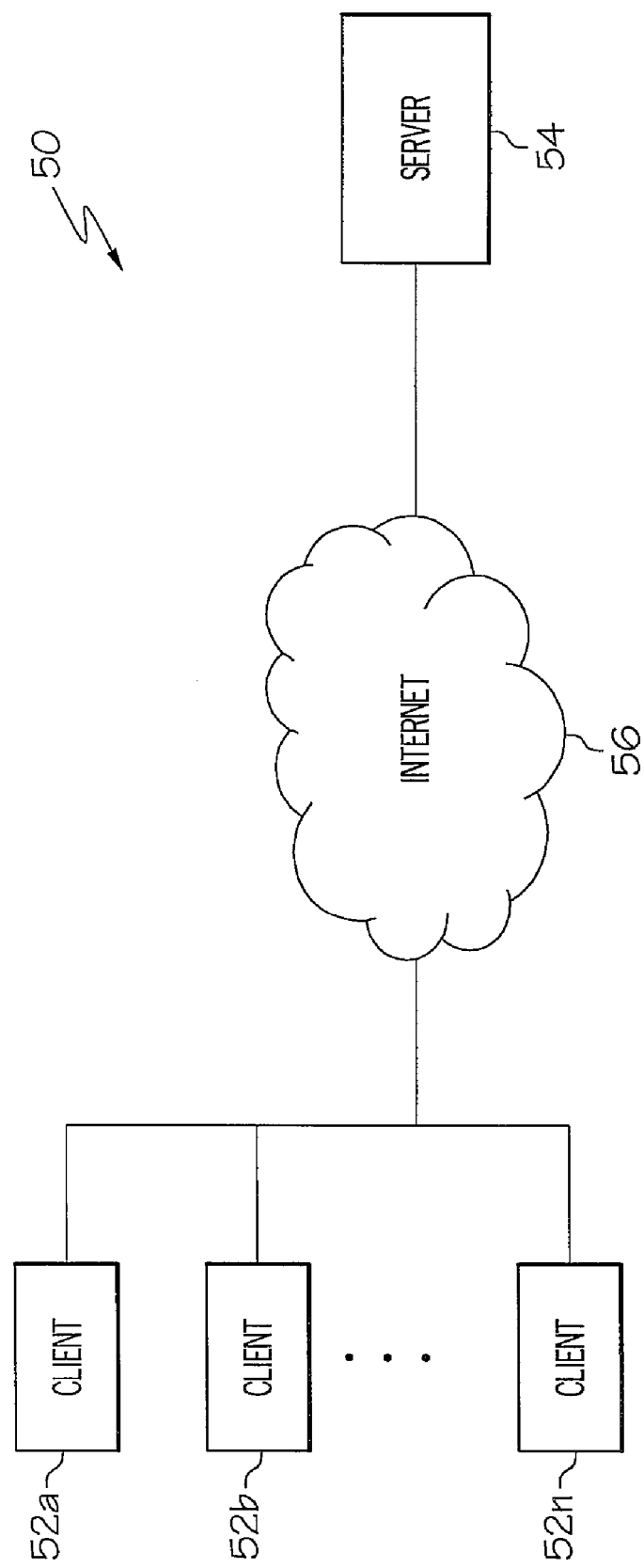
FIG. 1 is a block diagram illustrating an exemplary network in which an embodiment of the present invention may be implemented.

Referring now to the figures, and in particular, referring to FIG. 1, there is illustrated a block diagram depicting an exemplary network 100 in which an embodiment of the present invention may be implemented. As depicted, network 100 includes a collection of clients 102a-102n, Internet 104, and server 106. Clients 102a-102n are coupled to server 106 via Internet 104. While Internet 104 is utilized to couple clients 102a-102n to server 106, those with skill in the art will appreciate that a local-area network (LAN) or wide-area network (WAN) utilizing Ethernet, IEEE 802.11x, or any other communications protocol may be utilized. Clients 102a-102n and server 106 are discussed herein in more detail in conjunction with FIG. 2. According to an embodiment of the present invention, clients 102a-102n may utilize a browser stored in system memory to send and receive information to and from server 106. The information may include e-mails, web pages, and the like. Those with skill in the art will appreciate that exemplary network 100 may include other components such as routers, firewalls, etc. that are not germane to the discussion of the present network and will not be discussed further herein.

Figure 2:
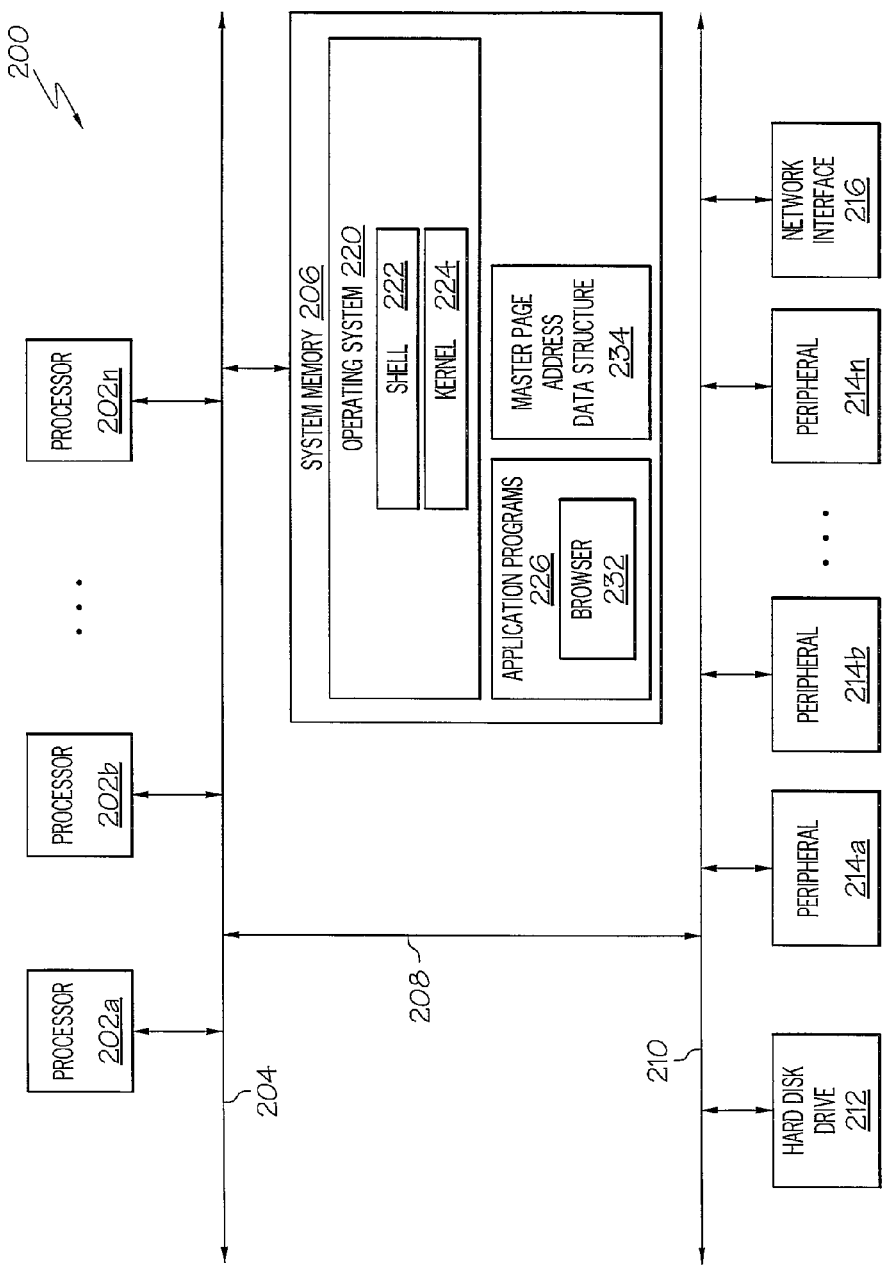
FIG. 2 is a block diagram depicting an exemplary data processing in which an embodiment of the present invention may be implemented.

FIG. 2 is a block diagram depicting an exemplary data processing system 200, which may be utilized to implement clients 102a-102n and server 106 as shown in FIG. 1. As illustrated, exemplary data processing system 200 includes a collection of processors 202a-202n that are coupled to a system memory 206 via a system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214a-214n, which may include, but are not limited to, optical drives, other hard disk drives, printers, and input devices, and the like. Network interface 216 enables data processing system 200 to communicate on a network, such as, but not limited to Internet 56.

Included in system memory 206 is operating system 220, which further includes a shell 222 (as it is called in the UNIX® operating system. UNIX® is a registered trademark of The Open Group in the United States and other countries), for providing transparent user access to resources such as application programs 226. Shell 222, also called a command processor in Microsoft® Windows® operating system, is generally the highest level of the operating system software hierarchy and serves as a command interpreter. Microsoft® and Windows® are trademarks of Microsoft Corporation in the United States, other countries, or both. Shell 222 provides a system prompt, interprets commands entered by keyboard, mouse, or other input media, and sends the interpreted command(s) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224 which includes lower levels of functionality for operating system 220 and application programs 226, including memory management, process and task management, disk management, and mouse and keyboard management. Application programs 226 can include browser 228, utilized for access to Internet 104 (FIG. 1), word processors, spreadsheets, and other application programs. System memory 206 also includes master page address data structure 234, which stores addresses and/or cached pages designated as master pages. When a user selects the "master page" option (discussed herein in more detail in conjunction with FIGS. 3 and 4), data processing system 200 retrieves the first master page address and/or cached page from master page address data structure 234 and displays the page in utilizing browser 228.

As discussed herein in more detail, browser 228 enables a user to navigate through web pages on the World Wide Web. As known to those with skill in the art, a user can open more than one browser instance to view multiple web pages at the same time. However, it can be tedious to navigate through several web sites for research, shopping, etc.

When navigating through several pages, backtracking to earlier pages can be both confusing and time consuming since going backwards in one's session involves the standard back button. The standard back button only retrieves the web page immediately prior to the current web page in a web navigation session. In some embodiments, the back button includes a scroll feature, which enables the user to recall a list of previously-visited web pages. The user can then select the desired web page from the list of previously-visited web pages. However, the list of previously-visited web pages usually only displays a limited list of the last few pages and is labeled by the page's title, which may not be unique and/or descriptive. Other embodiments also include a full history window, which displays all previously-visited web pages. However, the full history window is usually generally tedious to be utilized for anything other than an occasional search of a web site that was visited anywhere between several pages before or several days before.

In some embodiments, a user may navigate through several web sites. One of the web sites may include a master page of links (e.g., a search engine results page or a categorical master on a given web site). These master pages are gateways to several different paths a user may want to explore. To avoid the need to retrieve a previously-visited master page in a user's session, some users may launch a new path off of that master page in a new browser window or, in the case of browsers that support tabbed browsing, a new tab. This practice can be ultimately ineffective because the user may soon have several open windows to contend with for the sole purpose of maintaining the master page in an easily accessible location.

Figure 3:
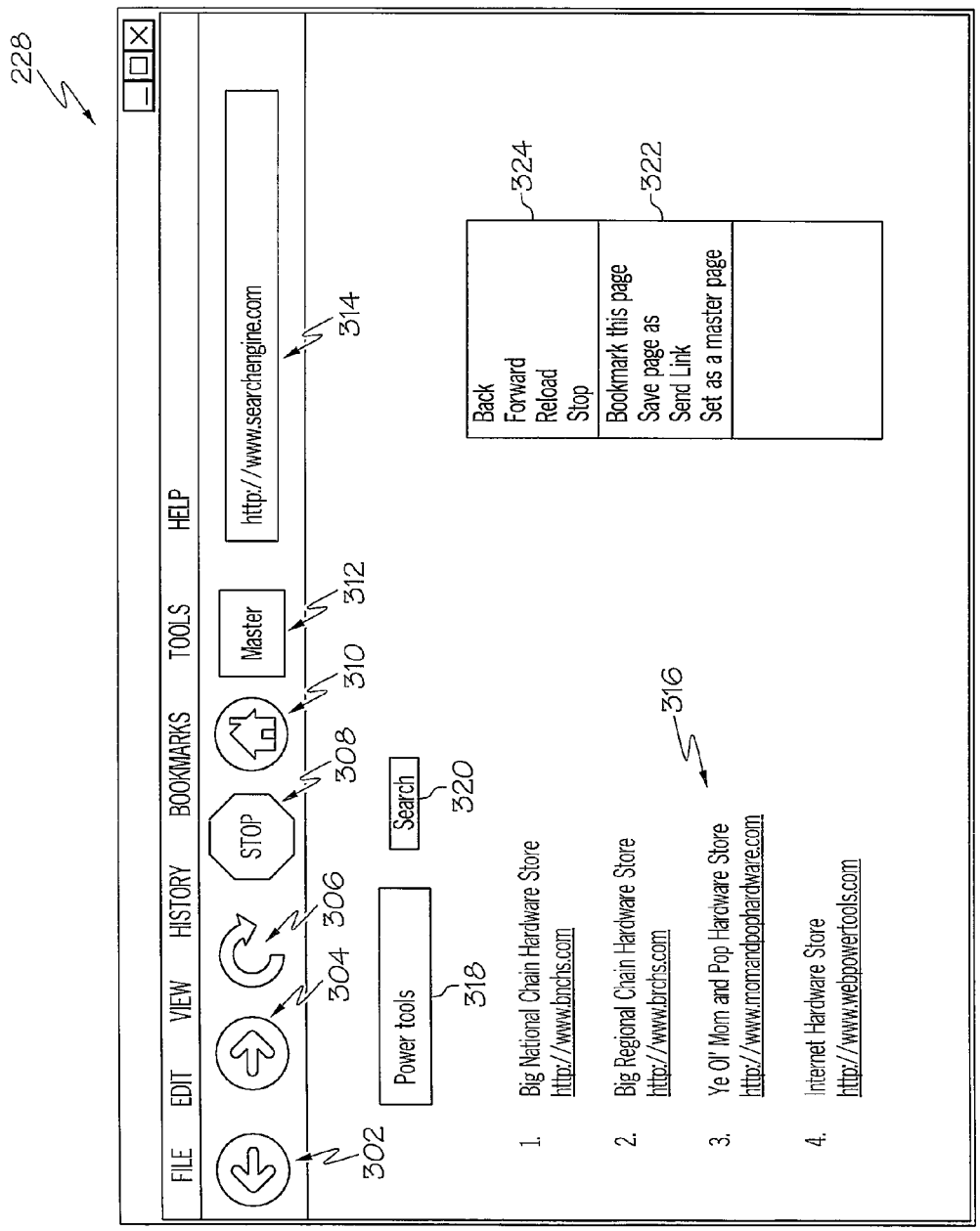
FIG. 3 is a pictorial representation of a browser according to an embodiment of the present invention.

FIG. 3 is a pictorial representation of a graphical user interface (GUI) of browser 228 according to an embodiment of the present invention. As illustrated, browser 228 includes a collection of toolbar buttons 302, 304, 306, 308, 310, and 312. Back button 302 and forward button 304 enables a user to navigate to pages that were visited before and after the presently displayed web page. Reload button 306 enables a user to refresh the currently-loaded web page. Stop button 308 enables a user to stop the loading of a current page. Home button 310 enables a user to navigate back to a user-defined or default home page. Master button 312 enables a user to return to a designated master page by retrieving an address and/or cached page from master page address data structure 234 and displaying the page from the address. Browser 228 also includes a uniform resource locator (URL) bar 314 that displays the web address of the current web page displayed by browser 228. As illustrated, browser 228 is displaying a search engine results page, which includes search results 316, a search field 318, and search button 320.

Those with skill in the art will appreciate that any input device may be utilized by data processing system 200 to receive input from a user. According to an embodiment of the present invention, data processing system 200 (FIG. 2) may utilize a two-button mouse as one of the input devices. Menu 324 is displayed by "right clicking" the two-button mouse. Menu 324 includes a collection of options that enable a user to perform functions within browser 228. Option 322 enables a user to set the present page as a "master page", which enables browser 228 to place the address of the currently displayed page on master page address data structure 234, as discussed herein in more detail in conjunction with FIG. 4.

Figure 4:
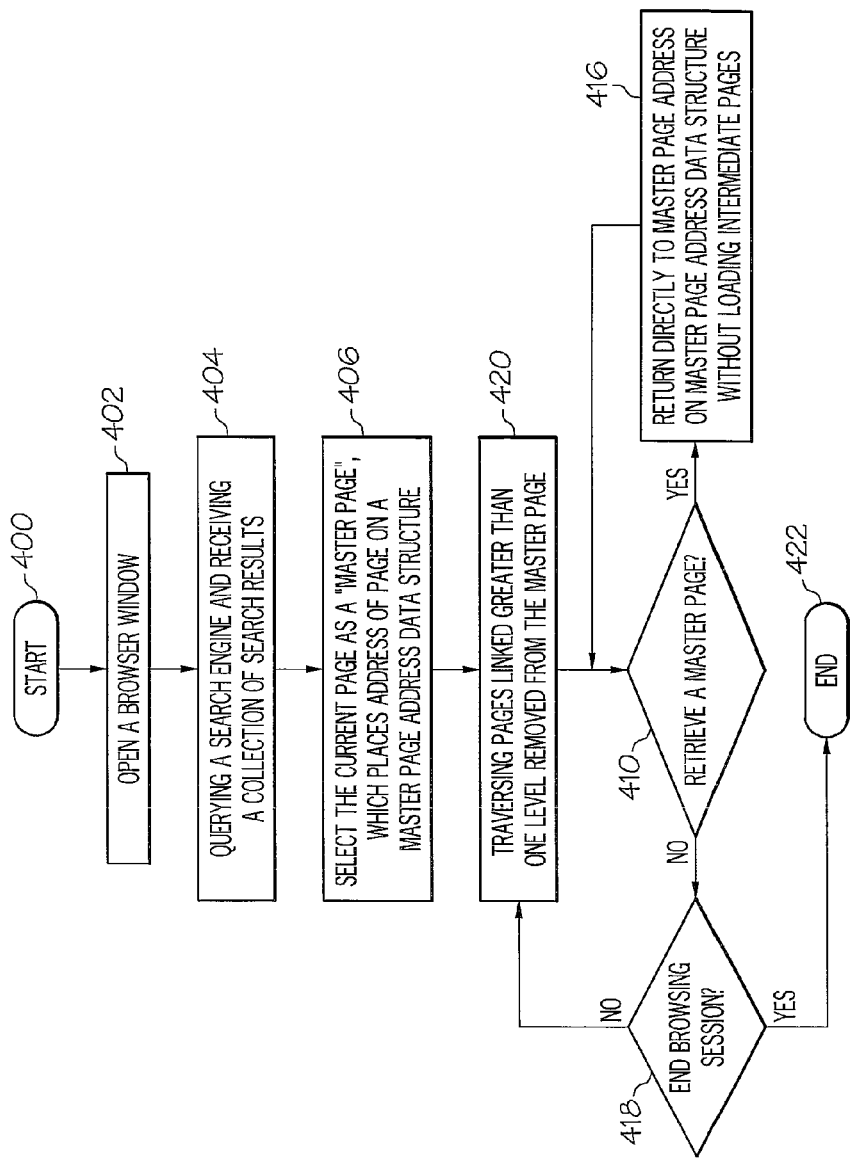
FIG. 4 is a high-level logical flowchart illustrating an exemplary method of implementing browser milestone navigation according to an embodiment of the present invention.

FIG. 4 is a high-level logical flowchart illustrating an exemplary method for implementing browser milestone navigation in a data processing system according to an embodiment of the present invention. The process begins at step 400 and proceeds to step 402, which illustrates a user opening a browser window (e.g., browser 228). The process continues to step 404, which depicts a user querying a search engine and receiving a collection of search results. The web page with the search results may be designated as a "master page". A search results page includes a collection of paths (which may be represented by a m-ary tree structure) that a user may take during the course of the browsing session.

The process continues to step 406, which illustrates the user selecting the current page as a master page. According to an embodiment of the present invention, the user may right-click the mouse to open menu 324 and select option 322 ("set as master page"). The address and/or a cached copy of the designated master page is placed on master page address data structure 234. The process continues to step 420, which depicts a user traversing web pages at least one level removed from the master page.

The process continues to step 410, which illustrates browser 228 determining if the user has requested retrieval of a master page. Browser 228 makes this determination by waiting for the user to select master button 312 or pressing a hot key combination that is mapped to master page retrieval. If the user has requested retrieval of a master page, the process continues to step 416, which depicts browser 228 retrieving a first master page address and/or cached page from master page address data structure 234 and displaying the web page in browser 228 without loading any intermediate pages previously visited by the user utilizing browser 228. The process returns to step 410.

If the user has not requested retrieval of a master page, the process continues to step 418, which illustrates browser 228 determining if the browsing session is to end. According to an embodiment of the present invention, the user may signal the end of a browsing session by closing a currently-displayed browser window. If the browsing session is to end, the process ends, as illustrated in step 422. If not, the process returns to step 420, which depicts data processing system 200 performing other processing.

As discussed, the present invention includes system and method for implementing browser milestone navigation in a data processing system. According to an embodiment of the present invention, a browser queries a search engine with at least one search term. In response to the query, the browser retrieves at least one web page that includes a collection of search results. The web page that includes the collection of search results is designated as a first master page. In response to the selection, the browser places a first address of the first master page on a master page address data structure. The browser traverses at least one page greater than one level removed from the first master page. The browser retrieves the first address from the master page address data structure, in response to receiving a first request to retrieve the first master page. The browser displays the first master page in the browser window without displaying any intermediate pages between the at least one web page greater than one level removed from the first master page and the first master page.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM, writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method for implementing browser milestone navigation in a data processing system, said method comprising:
   in response to a browser window being opened, providing a menu option to allow a user to designate a web search result page currently displayed on said browser window as a master page;
   in response to said master page designation, placing an address of said master page on a master page address data structure within a system memory of said data processing system;
   providing a master page button on a tool bar of said browser window to allow said user to request said master page by pressing said master page button via an input device;
   in response to a receipt of said request to retrieve said master page, retrieving said address of said master page from said master page address data structure; and
   displaying said master page in said browser window.

2. The method of claim 1, further comprising:
   allowing said user to designate a second web search result page as a second master page; and
   in response to said second master page designation, placing an address of said second master page on said master page address data structure.

3. The method of claim 2, further comprising:
   in response to a receipt of a request to retrieve said second master page, retrieving said address of said second master page from said master page address data structure; and
   displaying said second master page in said browser window.

4. A computer system comprising:
   a menu option, in response to a browser window being opened, for allowing a user to designate a web search result page currently displayed on said browser window as a master page;
   a system memory, in response to said master page designation, for storing an address of said master page in a master page address data structure;
   a master page button located on a tool bar of said browser window to allow a user to request said master page by pressing said master page button via an input device;
   in response to a receipt of said request to retrieve said master page, means for retrieving said address of said master page from said master page address data structure; and
   a display for displaying said master page in said browser window.

5. The computer system of claim 4, further comprising:
   means for allowing said user to designate a second web search result page as a second master page; and
   in response to said second master page designation, means for placing an address of said second master page on said master page address data structure.

6. The computer system of claim 5, further comprising:
   in response to a receipt of a request to retrieve said second master page, means for retrieving said address of said second master page from said master page address data structure and means for displaying said second master page in said browser window.

* * * * *